US012287146B2

(12) United States Patent
Loesch et al.

(10) Patent No.: US 12,287,146 B2
(45) Date of Patent: Apr. 29, 2025

(54) METHOD AND DEVICE FOR DRYING FINE PARTICULATE MATERIAL SUCH AS FRACKING SAND

(71) Applicant: Industrial Process Systems, Inc., Louisville, KY (US)

(72) Inventors: Leonard A Loesch, Louisville, KY (US); Oscar Mathis, Louisville, KY (US)

(73) Assignee: Industrial Process Systems, Inc., Louisville, KY (US)

( * ) Notice: Subject to any disclaimer, the term of this patent is extended or adjusted under 35 U.S.C. 154(b) by 0 days.

(21) Appl. No.: 17/804,344

(22) Filed: May 27, 2022

(65) Prior Publication Data

US 2022/0282916 A1 Sep. 8, 2022

Related U.S. Application Data

(62) Division of application No. 16/505,841, filed on Jul. 9, 2019, now Pat. No. 11,371,777.

(60) Provisional application No. 62/698,455, filed on Jul. 16, 2018.

(51) Int. Cl.

| | |
|---|---|
| ***F26B 17/32*** | (2006.01) |
| ***F26B 17/14*** | (2006.01) |
| ***F26B 23/02*** | (2006.01) |
| ***F26B 25/00*** | (2006.01) |

(52) U.S. Cl.

CPC .............. *F26B 17/32* (2013.01); *F26B 17/14* (2013.01); *F26B 23/02* (2013.01); *F26B 25/002* (2013.01); *F26B 2200/08* (2013.01)

(58) Field of Classification Search

CPC .......... F26B 17/32; F26B 17/14; F26B 23/02; F26B 25/002; F26B 2200/08; F26B 3/06; F26B 11/028; F26B 11/0481

USPC .................................................... 34/435, 136

See application file for complete search history.

(56) References Cited

U.S. PATENT DOCUMENTS

| | | | | | |
|---|---|---|---|---|---|
| 3,058,229 | A * | 10/1962 | Downing | F26B 11/04 | 34/136 |
| 3,401,923 | A * | 9/1968 | Bearce | F26B 11/0413 | 432/27 |
| 3,433,146 | A * | 3/1969 | Russell | F24C 15/20 | 55/DIG. 36 |
| 5,337,496 | A * | 8/1994 | Glorioso | C02F 11/12 | 34/387 |
| 6,478,461 | B1 * | 11/2002 | Frank | B01D 53/261 | 34/135 |
| 11,371,777 | B1 * | 6/2022 | Loesch | F26B 17/32 | |

* cited by examiner

*Primary Examiner* — Jessica Yuen

(74) *Attorney, Agent, or Firm* — Duncan Galloway Greenwald PLLC; Kevin T. Duncan

(57) ABSTRACT

A device and method for drying fine particulate. A parallel flow rotary drum dryer is used to dry the particulate material. There is a combustion chamber for the burner, located upstream of the dryer inlet, and the burner flame is limited to the combustion chamber so the fine particulate material does not come into direct contact with the burner flame. The output from the dryer passes through a knock-out box including a baffle system with a plurality of narrow gaps to create a pressure drop to slow down the gas flow and enable the entrained fine mesh dry particulate to drop out through a bottom outlet before the effluent gas is sent to the dust collection/air filtration system.

10 Claims, 6 Drawing Sheets

METHOD AND DEVICE FOR DRYING FINE PARTICULATE MATERIAL SUCH AS FRACKING SAND

CROSS-REFERENCE TO RELATED APPLICATION AND INCORPORATION BY REFERENCE

This application claims the benefit of priority to U.S. Provisional Application Ser. No. 62/698,455 filed Jul. 16, 2018, and to U.S. Non-Provisional patent application Ser. No. 16/505,841 filed Jul. 9, 2019, both of which are incorporated by reference herein in the entirety.

BACKGROUND

The present invention relates to a method and device for drying fine particulate material.

Hydraulic fracturing (also known as fracking) is a well stimulation technique in which rock is fractured by a pressurized liquid. The process involves the high-pressure injection of 'fracking fluid' (primarily water, containing sand or other proppants) into a wellbore to create cracks in the deep-rock formations through which natural gas, petroleum, and brine will flow more freely. When the hydraulic pressure is removed from the well, the grains of hydraulic fracturing proppants (typically fine sand) hold the fractures open.

Initially, local sand (30-70 mesh sand) was used in the fracking process. To dry this fairly coarse sand, a direct fired burner dryer was used. However, it was discovered that finer mesh, more spherical sand (100-140 mesh sand) yielded better results in the fracking process. This finer sand behaves almost like dust. This sand envelops the flame in the direct fired burner, rendering it very inefficient. Also, a large quantity of this dried sand is carried away by the effluent exiting the dryer and on to the dust collection device, typically a baghouse, which is overwhelmed by the dust. For those reasons, the fine sand is difficult to dry. Of course, the same problem would exist for other fine particulates of 80 mesh and finer.

SUMMARY

The present invention provides a device and method for drying this finer mesh sand used in the fracking process as well as other fine particulate material that is 80 mesh or finer. In an embodiment of the present invention, a separate combustion chamber houses the burner and its corresponding flame. The flame is controlled so that it does not extend beyond the combustion chamber. The fine, moist sand is fed into the dryer at a point downstream of the combustion chamber, so the fine sand is not in direct contact with the flame and does not envelop the flame of the burner. The sand and the hot effluent gases from the burner travel in a parallel flow arrangement to the output end of the dryer, with the hot gases heating the sand and driving the moisture out of the sand.

The dryer empties its output, which includes dry sand or other fine particulate material and effluent gases including water vapor, into a large cross-sectional-area knock-out box, which slows down the velocity of the effluent gases to allow the entrained dry particles to fall out of the flow stream through a bottom outlet, where they are collected. However, it has been found that, even when the knock-out box is large enough that the theoretical effluent velocities are low, a large portion of the effluent gases may take the path of least resistance from the dryer outlet to the dust collection ductwork inlet at a higher velocity than the theoretical velocity, carrying the fine, dry particulates along to the dust collection system. To minimize this phenomenon, a baffle is placed across the path of the effluent gases between the exit of the dryer and the ductwork inlet to the dust collection system to create a pressure drop and to spread out and slow down the effluent gas.

In a preferred embodiment, this baffle includes a plurality of longitudinal elements, separated from each other by small gaps. The baffle elements preferably are mounted on a cartridge housing to enable quick and easy replacement of the baffle as the longitudinal elements are eroded by the fine, dry particulate material.

DESCRIPTION

Figure 1:
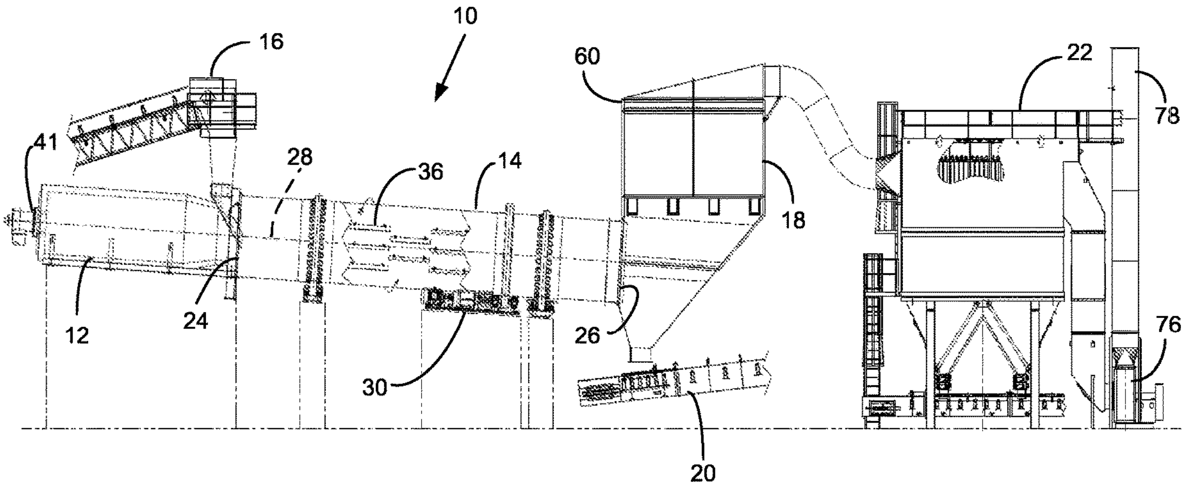
FIG. 1 is an overall equipment layout and flow diagram of a fine particulate drying facility, with some elements partially broken away to show their interior.
Figure 2:
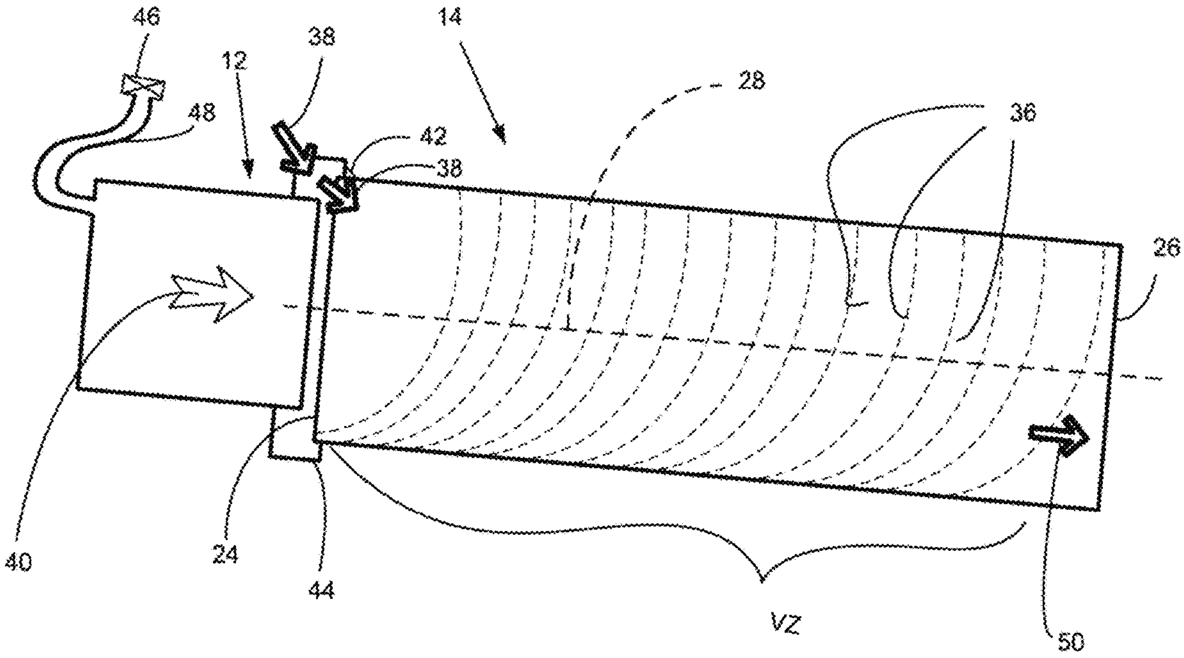
FIG. 2 is an enlarged view of the combustion chamber and the rotary dryer portion of the fine particulate drying facility of FIG. 1.
Figure 3:
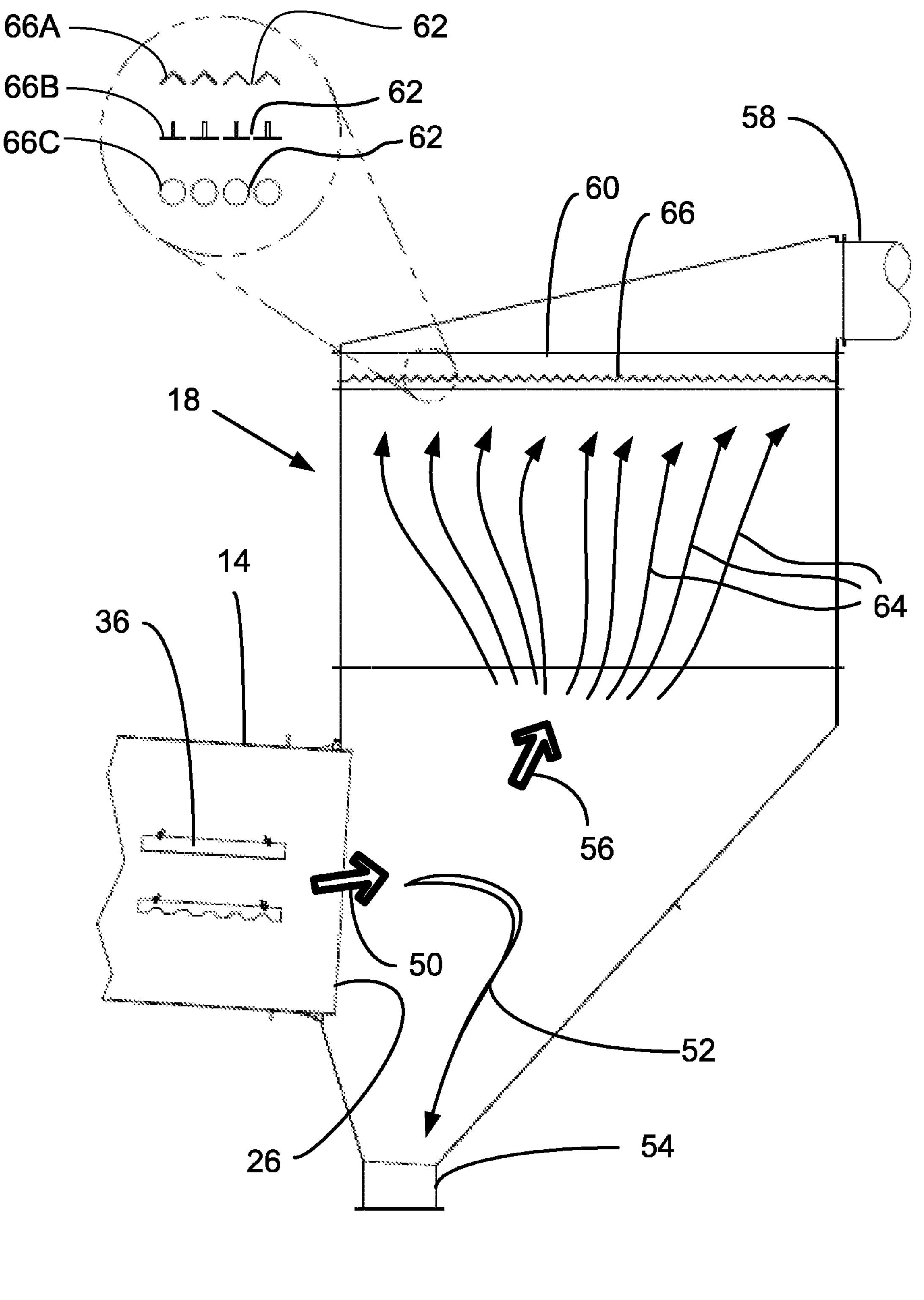
FIG. 3 is a schematic side view of the knock-out box of FIG. 1 with an inset showing three possible configurations for the plurality of longitudinal elements in the baffle of the knock-out box.

FIGS. 1-3 show a fine particulate dryer facility 10 in accordance with one embodiment of the present invention. This facility 10 includes a burner 41, a combustion chamber 12, a parallel flow rotary dryer 14, a wet particulate feed conveyor 16, a knock-out box 18, a dry particulate conveyor 20, a dust collection and fume control system 22, and material handling and conveying equipment as needed, all of which are described in more detail below.

It should be noted that a parallel flow rotary dryer 14 is a rotary dryer in which the hot air that heats and dries the raw material (the fine particulates) flows in the same downstream direction of flow as the raw material that is being heated and dried.

The rotary dryer 14 is mounted so that it tilts downwardly, with the inlet end 24 at a higher elevation than the outlet end 26. This rotary dryer 14 is driven to rotate about its longitudinal axis 28 in a normal manner, using a gear and pinion drive 30. The rotary dryer 14 also has appropriate internal flighting 36 (as shown diagrammatically in FIG. 2 and discussed in more detail later).

Referring briefly to FIG. 2, the internal veiling flights 36 transfer the raw material in the axial direction of the dryer 14 from the inlet end 24 to the outlet end 26 as the dryer 14 rotates. The veiling flights 36, typically in a spiral configuration, are intended to effectuate the raw material flow through the veiling zone (labeled VZ in FIG. 2) to prevent build up or back flow of the raw material. The veiling flights 36 also mix the raw material and facilitate heat transfer from the hot air to the raw material as the raw material travels downstream in the axial direction of the dryer 14, from the inlet end 24 to the outlet end 26 by repeatedly lifting the raw material and dropping it across the longitudinal axis 28 of the dryer 14, causing it to "shower" across the path of the hot air flow as the dryer 14 rotates to create a veiling zone, where there is substantial surface contact between the raw material and the co-flowing hot air and substantial mixing of the raw material. Advancing spiral flights (not shown) are used at the material feed entry point into the dryer. The veiling flights 36 follow the advancing spiral flights. The veiling flights 36 extend from the inlet end 24 (just beyond the advancing spiral flights) of the dryer 14 to the outlet end 26.

As was explained earlier, the rotary dryer 14 rotates about its longitudinal axis 28. This rotation works in conjunction with the veiling flights 36 inside the dryer 14 and with the downward tilt of the dryer 14 to lift the raw material and drop it, as if showering (or veiling) it over the flow of hot air proceeding downstream in a parallel flow configuration, traveling from the inlet, located just downstream of the combustion chamber 12 where the wet particulate material is introduced into the dryer 14 as denoted by the small dark arrows 38, to the outlet 26 of the dryer 14, where the dried particulate and the gases leave the dryer 14.

The flame from the burner, as denoted by the thick white arrow 40 shown in FIG. 2, is confined inside the combustion chamber 12 and thus is separated from the incoming wet particulate feed 38 so the fuel in the burner 41 (See FIG. 1) is able to fully combust to generate a flow of hot air into the rotary dryer 14 without interference from the particulate material 38. The showering or veiling of the raw material enhances the transfer of heat from the hot air to the raw material as the raw material is transported from the inlet end 24 (and away from the combustion chamber 12) downstream to the outlet end 26 of the dryer 14.

Referring back to FIG. 1, as the raw material reaches the outlet 26 of the dryer 14, the dried and heated raw material and gases flow out of the dryer 14 and into the knock-out box 18.

The burner/refractory chamber assembly 12 is coupled to the inlet end 24 of the dryer 14, with the outlet of the refractory chamber 12 directed downstream, into the inlet end 24 of the rotary dryer 14. This particular burner/refractory chamber assembly 12 does not rotate. As is well-known in the art, a first plurality of tempered spring steel "flex-steel" plates, projecting inwardly from the stationary burner/refractory chamber assembly 12 mesh with a second plurality of "flex-steel" plates projecting outwardly from the rotary drum 14 to form an air seal 42 (See FIG. 2) between those two assemblies 12, 14. As shown in FIG. 2, a non-rotating housing 44 couples the refractory chamber 12 to the rotating dryer 14, and the seal 42 limits the amount of air which is allowed to leak into the rotary dryer 14. (Alternatively, it would be possible for the refractory chamber, and even the burner, to rotate with the rotary dryer 14.) As also shown in FIG. 2, a fan or blower 46 is connected to the combustion chamber 12 via a duct 48 to provide the required amount of air for complete combustion plus approximately 20% excess air. A controlled amount of bleed air (also referred to as quench air) is provided through ports (not shown) at the burner end of the combustion chamber 12. These ports have adjustable dampers to control the amount of bleed/quench air that is drawn into the combustion chamber 12 by the induced draft fan 76 (See FIG. 1) on the clean side of the baghouse.

A baffle-type burner 41 (See FIG. 1) is provided to heat the incoming air to the desired temperature to generate a hot air flow which heats and dries the raw material in the rotary dryer 14. The burner flame and air flow are controlled to heat the raw material to a desired temperature as it exits the dryer 14 at the outlet 26. The hot air generated by the flame 40 is directed downstream into the inlet end 24 of the rotary dryer 14. It should be noted that the diameter and length of the combustion chamber 12 are designed based on the maximum overall flame envelope the burner can generate at any firing rate to ensure that the combustion flame 40 is confined to the combustion chamber 12 and terminates before the inlet 24 of the dryer 14, and the hot air stream generated by the combustion flame 40 flows downstream through the rotary dryer 14 to the outlet 26.

Referring now to FIG. 3, the knock-out box 18 is a large rectangular box (in this embodiment the box is approximately 17' wide×17' deep×36' tall) which provides sufficient cross-sectional area to slow down the effluent flow 50 to approximately 120 feet per minute (fpm) or less, based on a mathematical calculation of the volume of effluent flow and the cross-sectional area of the box. Of course, for larger particulate matter (such as the 70 mesh material) the velocity may be higher, say up to 140 fpm, while still allowing the particulates to fall out of the gas flow, but the velocity is preferably kept at or below 120 fpm. A tapered housing at the bottom of the knockout box 18 directs particulate material to the bottom outlet 54.

The heated and now dry particulate 50 as well as the gases, including water vapor (represented by the dark arrow 50) leave the dryer 14 at the outlet end 26 of the dryer 14 and enter the tapered housing at the bottom of the knock-out box 18. Because of the large cross-sectional area of the knock-out box 18, and the low flow rate of the gases, the bulk of the particulate material in the effluent flow 50 drops down through the tapered bottom portion (see arrow 52) and exits the knock-out box 18 via the bottom outlet 54 and onto the dry particulate conveyor 20 (See FIG. 1).

The effluent gases 56 pass upwardly through a baffle 60 and out the outlet duct 58 leading to the dust collection system 22. In this embodiment, the baffle cartridge 60 is approximately 17' wide×17' deep×1' (or less) tall and extends across the full path of the effluent gases 56, so all the effluent gases have to pass through the small gaps defined by the baffle 60.

Figure 4:
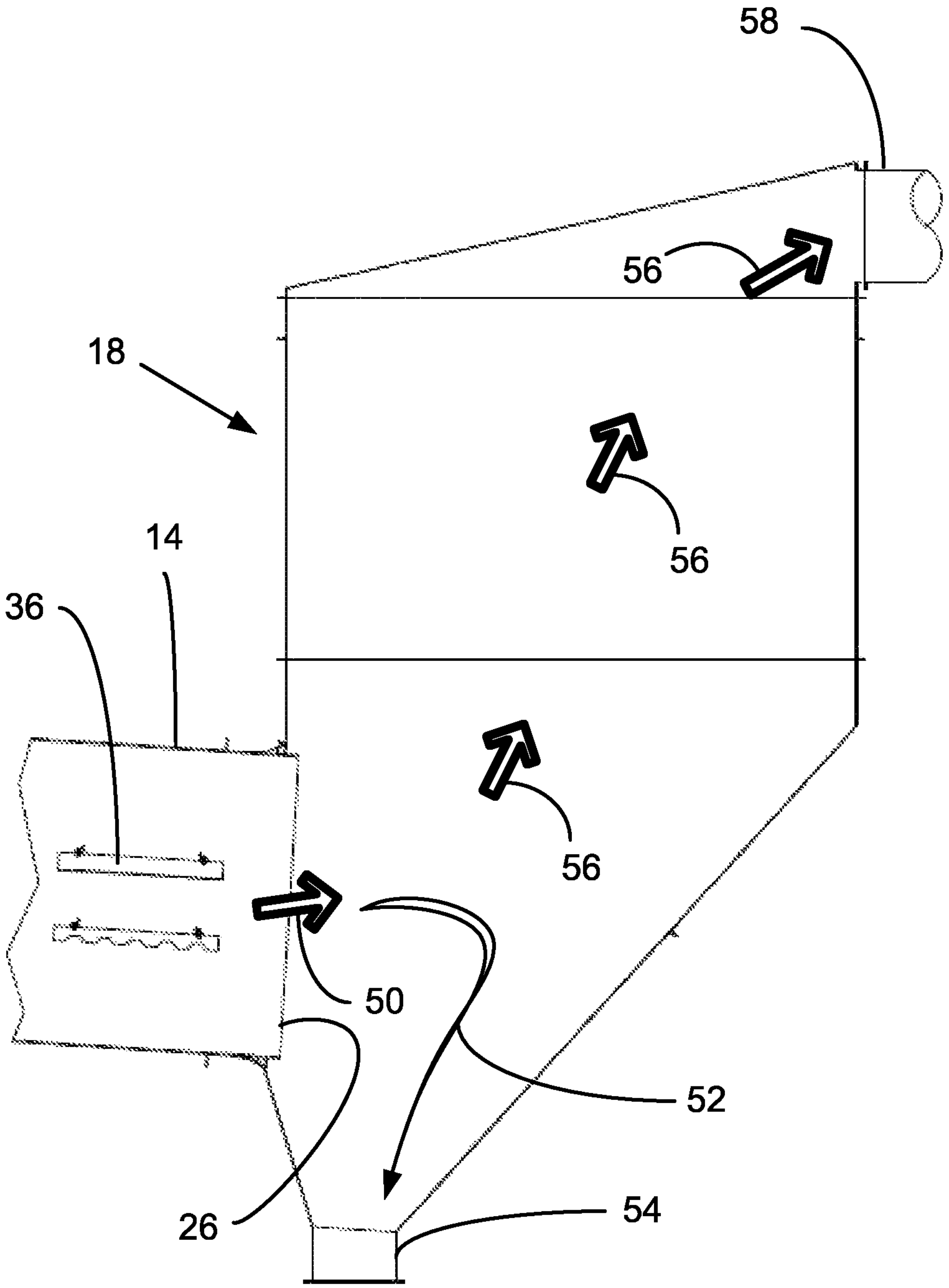
FIG. 4 is the same view as FIG. 3 but without the baffle in the knock-out box.

If there were no baffle 60, as in FIG. 4, much of the effluent gas would not slow down enough for the particles to fall out of the gas stream, so much of the particulate material would be carried by the effluent gases 56 to the dust collection system 22. To minimize this phenomenon, the baffle 60 as shown in FIG. 3 is used. The baffle 60 defines small gaps through which the effluent gas must pass in order to reach the outlet duct 58. These small gaps create a pressure drop just before the outlet of the knock-out box 18 and slow down the flow. With this arrangement, it is possible to obtain particulate recoveries of 99.5%, such that less than 0.5% of the particulates end up in the baghouse.

Figure 6:
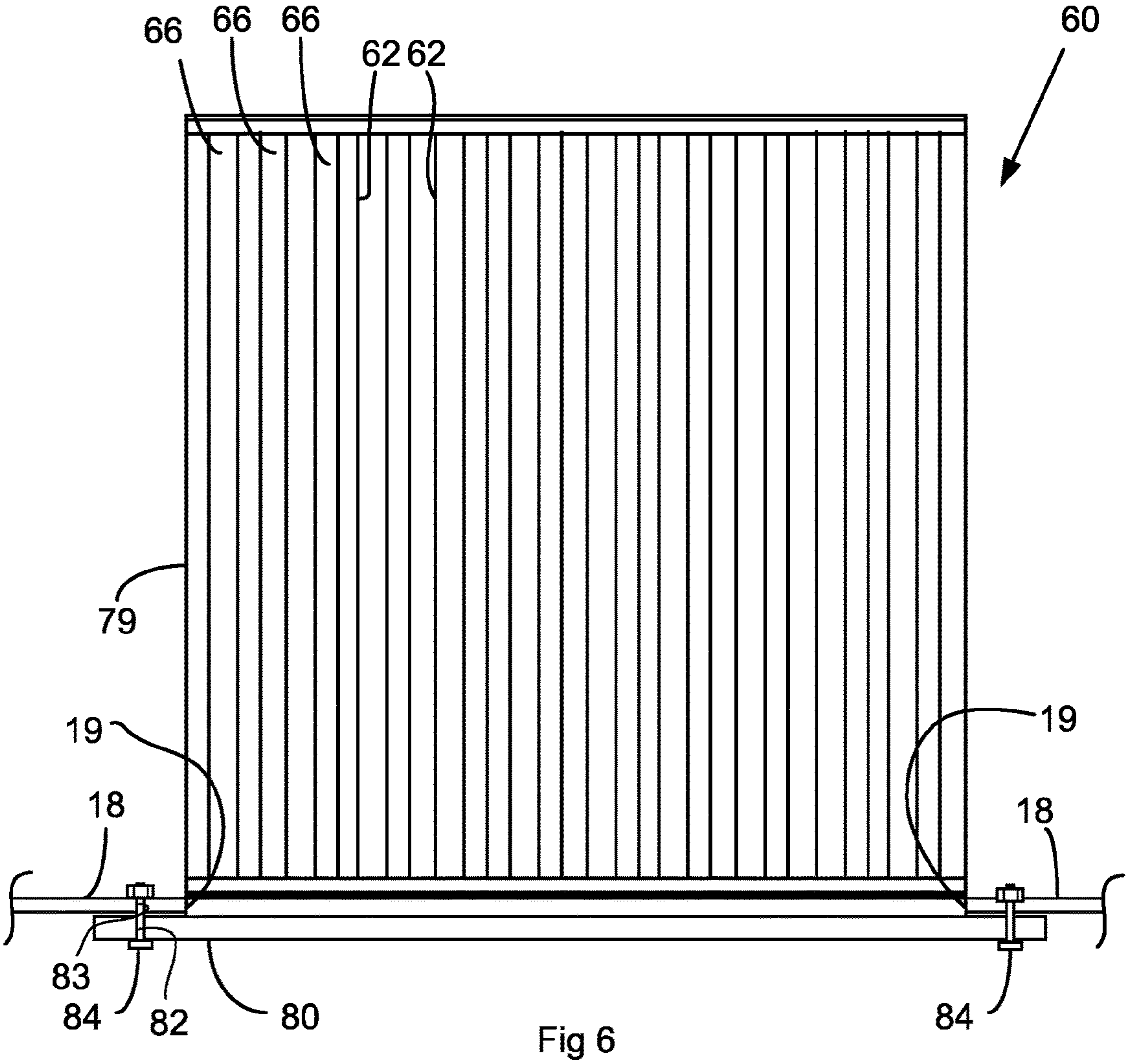
FIG. 6 is a plan view of the cartridge with the baffles of FIG. 3.

As best appreciated in FIGS. 3 and 6, the baffle 60 comprises a plurality of longitudinal elements 66, arranged parallel to each other, with small gaps 62 between the longitudinal elements 66 (See inset in FIG. 3) to hinder the flow of the effluent gases 56, which creates a pressure drop. The baffle 60 causes the effluent flow 56 to split up into a plurality of smaller, slower effluent flows, represented diagrammatically by the arrows 64. The spread-out effluent flow 56, which has been split up into a plurality of smaller, slower flows 64, takes advantage of the full cross-sectional area of the knock-out box, instead of taking a "shortcut" as would occur if no baffle 60 were present, as in FIG. 4. As the flow of effluent gas is forced to spread out over the full available cross-sectional area, the velocity of the effluent gas slows down to the point that the vast majority of the entrained dry particles falls out of the gas stream and leaves the knock-out box 18 via the outlet 54 at the bottom of the knock-out box 18.

The inset of FIG. 3 shows three possible cross-sectional profiles for the longitudinal elements 66 of the baffle 60. The elements 66A have a cross-section that looks like an inverted "V", with a small gap 62 between each pair of adjacent elements 66A, wherein the gaps 62 are substantially the same dimension between each pair of adjacent elements 66A. This gap is between ¼" and ½" wide, and most preferably is ⅜ inches wide. The elements 66B have a cross-section that looks like an inverted "T", with the vertical component of the "T" providing the necessary structural integrity to each element. Again, there are gaps 62 defined between the elements 66B. The elements 66C may be cylinders or rods. Again, all of these elements 66A-C define small gaps 62 to restrict the passage of the effluent flow.

Figure 7:
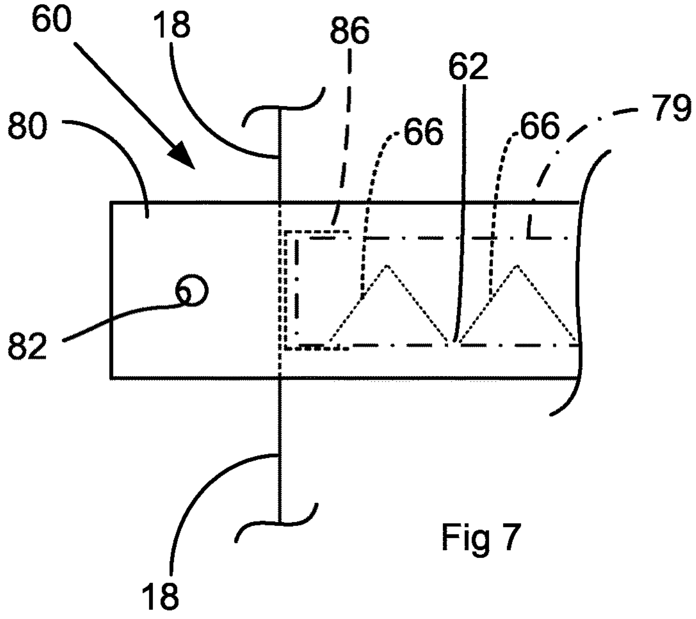
FIG. 7 is a broken-away view of the left end of the cartridge of FIG. 3, showing the track for sliding and supporting the cartridge inside the knock-out box.

The baffle 60 is formed as a cartridge, similar to a drawer, which slides into an opening in the knock-out box 18. As shown in FIGS. 6 and 7, the drawer 79 of the cartridge 60 includes a rectangular frame that contains the plurality of longitudinal elements 66 which are arranged so as to define a gap 62 between each of the longitudinal elements 66. There is a front face 80 mounted on the front of the drawer 79, which is large enough to extend beyond the opening 19 in the wall of the knock-out box 18 in all directions in order to seal against the wall of the knock-out box 18 around the opening 19 to prevent ambient air intrusion into the knock-out box 18. This front face 80 defines openings 82 which align with openings 83 in the wall of the knock-out box 18 to receive bolts 84 which secure the baffle cartridge 60 to the knock-out box 18. "C"-shaped tracks 86 (See FIG. 7) are mounted inside the knock-out box 18 to provide slidable support for the drawer 79 inside the knock-out box 18.

As the longitudinal elements 66 of the baffle 60 erode, the size of the gaps 62 between the elements 66 increases, the pressure drop across the baffle 60 is reduced, and the baffle becomes less effective. Since the baffle 60 preferably is formed as a cartridge, it is easily removed from the knock-out box 18 by unbolting the bolts 84 around the face 80 of the cartridge 60 and sliding it out. A new baffle cartridge 60 may then be readily installed and bolted in place.

Alternatively, instead of installing a baffle cartridge 60 like a drawer, a baffle cartridge 60 may be installed simply by removing the roof portion of the knock-out box 18, inserting the baffle cartridge 60, bolting it in place, and then re-installing the roof portion of the knock-out box 18.

Figure 5:
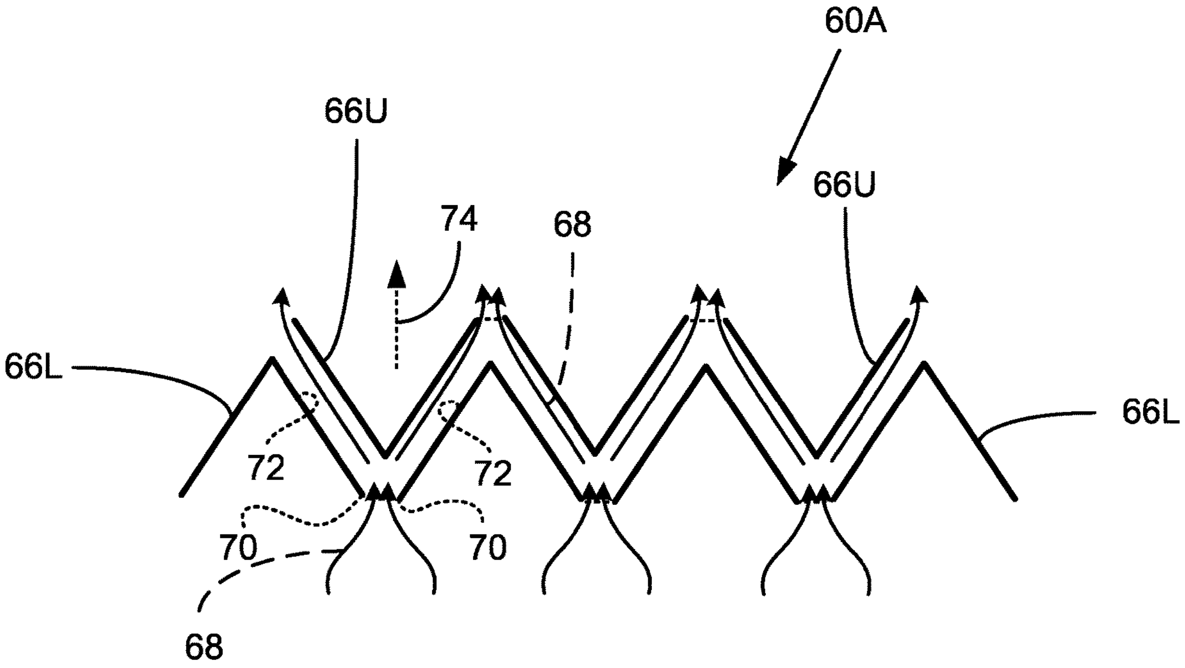
FIG. 5 is a broken away, end view of the longitudinal elements of an embodiment of the baffle wherein the gap defined by the longitudinal elements may be adjusted to compensate for erosion of the longitudinal elements.

FIG. 5 is a broken away, schematic end view of some of the elements 66U and 66L of an alternative embodiment of a baffle 60A. In this embodiment, the lower elements 66L are substantially identical to the elements 66A of the inset in FIG. 3. The upper elements 66U are identical to the lower elements 66L but are placed "upside down" and offset over the lower elements 66L to define a plurality of tortuous paths 72 for the effluent to pass through the baffle 60A, as depicted by the arrows 68. In this instance, as the leading edges 70 of the lower elements 66L of the baffle 60 are eroded by the particulate laden effluent, the pressure drop remains substantially unchanged as the pressure drop is determined less by the gap between adjacent leading edges 70 of the lower elements 66L and more by the width (gap) of the paths 72 between adjacent upper and lower elements 66U, 66L, which takes a much longer time to substantially change through erosion. Thus, this baffle 60A should last longer than the baffles 60 described earlier before having to be replaced.

In yet another variation on the baffle 60A, and again referring to FIG. 5, the width (gap) of the paths 72 may be adjusted by mounting the upper elements 66U on an upper frame, separate from that of the lower elements 66L and then shifting the upper frame, as indicated by the dotted arrow 74, relative to the fixed lower frame. (Alternatively, the upper frame may be fixed and the lower frame may be movable, or both frames may be movable.) This relative height adjustment between the upper and lower elements 66U, 66L may be used to adjust the pressure drop by adjusting the width (gap) of the paths 72. The spacing may be adjusted to optimize the dry particulate recovery at the bottom discharge chute 54 of the knock-out box 18 while minimizing the power consumption of the fan 76 (See FIG. 1) which draws effluent from the rotary dryer 14 through the knock-out box 18 and baffle 60A and to the air filtration system and ejects the cleaned air (containing mostly air, steam, and non-condensables) via the stack 78.

It may be advisable to install ports upstream and downstream of the baffle 60 and to insert upstream and downstream pressure gauges at the ports to obtain accurate pressure drop readings during operation. These pressure drop readings may be sent to a controller and may be used to determine when the baffle 60 needs to be replaced or, in the case of an adjustable baffle 60A, the readings may be used as a basis for adjusting the spacing between the elongated elements in order to help optimize the operating parameters of the particulate drying facility. Adjustment of the relative heights between the upper and the lower elements 66U, 66L in the baffle 60A will be reflected in changing pressure drop readings, and these readings can then be correlated to provide the best dry particulate recovery from the discharge chute 54 of the knock-out box 18 and the least dry particulate load on the air filtration system for a given power consumption load on the fan 76.

There are many ways to accomplish the adjustability of the width of the paths 72. For example, the upper frame on which the upper elements 66U are mounted may be pinned to the baffle cartridge frame by pins or bolts, and there may be a number of different holes in the baffle cartridge frame through which the pins or bolts may be located to change the height of the upper frame relative to the baffle cartridge frame in order to provide different spacings. Alternatively, the adjustment may be automated, with one of the upper and lower frames being fixed and the other being movable toward and away from the fixed frame using hydraulic or other actuators in response to a control signal from a controller, which is receiving signals from the upstream and downstream pressure gauges and is controlling the distance between the upper and lower frames to control the pressure drop.

While the embodiments described above show some arrangements for a facility for drying of fine mesh particulate, it will be obvious to those skilled in the art that modifications could be made to the arrangements described above without departing from the scope of the present invention as claimed.

What is claimed is:

1. An arrangement for drying small particulate material, comprising:

a parallel flow rotary dryer, having an inlet end and an outlet end, the inlet end being elevated above the outlet end so that the parallel flow rotary dryer tilts downwardly, and defining a downstream direction from said inlet end toward said outlet end, and including a burner and a combustion chamber upstream of said inlet end; and a knock-out box in fluid communication with said outlet end, said knock-out box including a baffle defining a plurality of narrow gaps through which gaseous material from said outlet end may pass in order to exit said knock-out box; and wherein said baffle includes a set of upper elongated elements and a set of lower elongated elements and defines a plurality of equal-width paths for particulate material to pass between said upper elongated elements and said lower elongated elements;

wherein at least one of said sets of elongated elements is movable for adjusting the width of said equal-width paths, and wherein said combustion chamber is sized to ensure that a flame from said burner remains within said combustion chamber for all firing rates of said burner.

2. An arrangement for drying small particulate material as recited in claim 1, wherein said baffle is mounted on a removable baffle cartridge for easy removal and replacement of said baffle cartridge from said knock-out box.

3. An arrangement for drying small particulate material as recited in claim 1, wherein the gaps within said plurality of narrow gaps are substantially the same dimension, said dimension being between ¼" and ½" wide.

4. An arrangement for drying small particulate material as recited in claim 1 further comprising a set of ports upstream and downstream of the baffle and a set of upstream and downstream pressure gauges respectively disposed at the set of ports to measure pressure drop during operation.

5. An arrangement for drying small particulate material as recited in claim 4, wherein the measured pressure drop is used to adjust the spacing between the respective sets of upper and lower elongated elements.

6. A fine particulate drying facility for drying small particulate material, comprising:

a burner;

a combustion chamber;

at least one particulate feed conveyor;

a parallel flow rotary dryer, having an inlet end and an outlet end, providing the inlet end at an elevation above the outlet end so that the parallel flow rotary dryer tilts downwardly, and defining a downstream direction from said inlet end toward said outlet end, and including a burner and a combustion chamber upstream of said inlet end; and a knock-out box in fluid communication with said outlet end, said knock-out box including a baffle defining a plurality of narrow gaps through which gaseous material from said outlet end may pass in order to exit said knock-out box; and wherein said baffle includes a set of upper elongated elements and a set of lower elongated elements and defines a plurality of equal-width paths for particulate material to pass between said upper elongated elements and said lower elongated elements;

wherein at least one of said sets of elongated elements is movable for adjusting the width of said equal-width paths, and wherein said combustion chamber is sized to ensure that a flame from said burner remains within said combustion chamber for all firing rates of said burner.

7. A fine particulate drying facility for drying small particulate material as recited in claim 6, wherein said baffle is mounted on a removable baffle cartridge for easy removal and replacement of said baffle cartridge from said knock-out box.

8. A fine particulate drying facility for drying small particulate material as recited in claim 6, wherein the gaps within said plurality of narrow gaps are substantially the same dimension, said dimension being between ¼" and ½" wide.

9. A fine particulate drying facility for drying small particulate material as recited in claim 6 further comprising a set of ports upstream and downstream of the baffle and a set of upstream and downstream pressure gauges respectively disposed at the set of ports to measure pressure drop during operation.

10. An arrangement for drying small particulate material as recited in claim 9, wherein the measured pressure drop is used to adjust the spacing between the respective sets of upper and lower elongated elements.

* * * * *